United States Patent
Ishii et al.

(10) Patent No.: US 7,011,004 B2
(45) Date of Patent: Mar. 14, 2006

(54) TRIMMING APPARATUS AND METHOD FOR FUEL CELL MEMBRANE/ELECTRODE COUPLING AND TRANSPORTING APPARATUS

(75) Inventors: Tetsuo Ishii, Sayama (JP); Akihiro Ohsugi, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 287 days.

(21) Appl. No.: 10/482,454

(22) PCT Filed: Jun. 28, 2002

(86) PCT No.: PCT/JP02/06541

§ 371 (c)(1),
(2), (4) Date: Dec. 30, 2003

(87) PCT Pub. No.: WO03/005468

PCT Pub. Date: Jan. 16, 2003

(65) Prior Publication Data

US 2004/0173072 A1    Sep. 9, 2004

(30) Foreign Application Priority Data

| Jul. 6, 2001 | (JP) | ............................ 2001-206663 |
| Jul. 6, 2001 | (JP) | ............................ 2001-206691 |
| Jul. 6, 2001 | (JP) | ............................ 2001-206709 |
| Jul. 6, 2001 | (JP) | ............................ 2001-206723 |
| Jul. 9, 2001 | (JP) | ............................ 2001-208189 |

(51) Int. Cl.
  *B26D 7/01* (2006.01)
  *B26D 7/08* (2006.01)
  *H01M 8/00* (2006.01)

(52) U.S. Cl. ............................ 83/24; 83/100; 83/123; 83/686

(58) Field of Classification Search ................ 83/22, 83/24, 100, 123, 125, 126, 686
See application file for complete search history.

(56) References Cited

U.S. PATENT DOCUMENTS

| 6,035,750 A | * | 3/2000 | Hansen .......................... 83/24 |
| 6,095,023 A | * | 8/2000 | Harada et al. .................. 83/22 |
| 6,173,632 B1 | * | 1/2001 | Choy ............................. 83/13 |
| 2001/0003936 A1 | * | 6/2001 | Song ............................. 83/24 |

FOREIGN PATENT DOCUMENTS

| JP | 64-19262 | 1/1989 |
| JP | 8-45517 A | 2/1996 |
| JP | 2000-123848 | 4/2000 |
| JP | 2000-268829 A | 9/2000 |
| JP | 2000-294257 A | 10/2000 |
| JP | 2001-236971 A | 8/2001 |

* cited by examiner

Primary Examiner—Charles Goodman
(74) Attorney, Agent, or Firm—Rankin, Hill, Porter & Clark LLP

(57) ABSTRACT

A membrane/electrode assembly trimming apparatus (10) made up of a lower trimming die (14) on which a membrane/electrode assembly (65) is set, an upper trimming die (16) having a trimming blade (15) and a pressing member (17) which is ascend/descendably suspended from this upper trimming die and suction-holds a carbon electrode (12). A membrane/electrode assembly carrying apparatus (72) including a pressing member which suction-grips a carbon electrode and prevents it from slipping sideways is also disclosed. Because the certainty of the positioning, fixing and trimming of the membrane/electrode assembly at the time of trimming is raised and positional slipping of the trimmed membrane/electrode assembly during carrying can be prevented, the performance of the fuel cell improves.

11 Claims, 13 Drawing Sheets

TRIMMING APPARATUS AND METHOD FOR FUEL CELL MEMBRANE/ELECTRODE COUPLING AND TRANSPORTING APPARATUS

TECHNICAL FIELD

This invention relates generally to the manufacture of a fuel cell and particularly to a fuel cell membrane/electrode assembly trimming system in which a fuel cell membrane/electrode assembly is positioned and fixed certainly for trimming and positional deviation during carrying of the fuel cell membrane/electrode assembly after trimming is prevented, and to a fuel cell membrane/electrode assembly carrying apparatus with which a trimming step and a carrying step are made to connect smoothly and a transition from the carrying step to a stacking step is made smooth.

BACKGROUND ART

A fuel cell is a cell which utilizes the opposite principle to the electrolysis of water to obtain electricity in the process of obtaining water by causing a reaction between hydrogen and oxygen. Because generally a fuel gas is substituted for hydrogen and air or an oxidant gas is substituted for oxygen, the terms fuel gas, air and oxidant gas are often used.

As this kind of fuel cell, for example the "fuel cell" in JP-A-2000-123848 is known. The cell of this fuel cell is constructed as shown in FIG. 11.

As shown in FIG. 11, a cell 100 is made by affixing an anode side electrode 102 and a cathode side electrode 103 to both sides of an electrolyte membrane 101 and sandwiching the anode side electrode 102 and the cathode side electrode 103 with two separators 104, 105. Multiple flow grooves 106 for supplying hydrogen gas, which is a fuel, to the anode side electrode 102 are formed in the separator 104, and multiple flow grooves 107 for supplying oxygen gas, which is an oxidant gas, to the cathode side electrode 103 are formed in the separator 105. A required voltage is obtained by stacking numerous cells 100 constructed like this.

The reference numerals 111, 112 denote seals (gaskets) for sealing the gaps between the electrolyte membrane 101 and the separators 104, 105.

The electrolyte membrane 101 is a polymer electrolyte membrane (PEM: Polymer Electrolyte Membrane) made of a polymer compound. This electrolyte membrane 101 will hereinafter be written PEM 101.

And, the PEM 101, the anode side electrode 102 and the cathode side electrode 103 constitute a membrane/electrode assembly (MEA: Membrane Electrode Assembly) 108. This membrane/electrode assembly 108 will hereinafter be written MEA 108.

In the above-mentioned Japanese patent publication there is no description of a manufacturing method and a carrying method of the MEA 108, but generally a method is known wherein [1] to the front and rear sides of a PEM cut larger than the shape to which it is to be finally shaped an anode side electrode 102 and a cathode side electrode 103 with a smaller area than this PEM are press-affixed; [2] the edge of the PEM is finally shaped by cutting (trimming) with a trimming blade; and [3] the trimmed membrane-form MEA 108 is suction-gripped with a suction-gripping device while being carried to the next step.

The present inventors tried this manufacturing and carrying, but in the trimming (final shaping) step [2] and the carrying step [3] the kinds of problem shown in FIG. 12A to FIG. 12C arose.

FIG. 12A to FIG. 12C are explanatory views illustrating an MEA trimming step and a carrying step which follows this trimming step: FIG. 12A is a sectional view showing the trimming process; FIG. 12B is a sectional view showing a suction-gripping operation; and FIG. 12C is a sectional view showing a carrying operation.

In FIG. 12A, with a PEM 101a with electrodes 102, 103 affixed to it placed on a table 121 and positioned by positioning means not shown in the figure, a press apparatus 123 fitted with a trimming blade 122 is lowered as shown by the white arrow and the PEM 101a is trimmed. To distinguish it from the post-trimming PEM 101, the pre-trimming PEM is denoted with the reference numeral 101a.

In FIG. 12B, after trimming of the PEM 101 is finished, a suction-gripping apparatus 124 separate from the press apparatus 123 (see FIG. 12A) is lowered as shown by the white arrow and suction-grips the MEA 108.

In FIG. 12C, the MEA 108 suction-gripped by the suction-gripping apparatus 124 is lifted as shown by the white arrow d and carried to a subsequent stacking step as shown by the white arrow e.

In FIG. 12B, because the press apparatus 123 shown in FIG. 12A and the suction-gripping apparatus 124 shown in FIG. 12B are interchanged on the table 121 before the suction-gripping operation is carried out, the flow temporarily stops at the time of the transition from the trimming process to the suction-gripping process. Consequently, when trimming and carrying of the MEA 108 are carried out continuously on a production line, productivity can be expected to fall greatly.

The MEA 108, having had its edges trimmed to a predetermined size, after this edge-trimming, is carried from a trimming station, where the edge-trimming is carried out, to a stacking station, to be stacked with a separator. In FIG. 12A and FIG. 12B, from when the PEM 101a is trimmed by the press apparatus 123 to when it is suction-gripped by the suction-gripping apparatus 124, for example, if the position of the MEA 108 slips, the MEA 108 is carried by the suction-gripping apparatus 124 with its position still slipped, and in the stacking step, the position of the MEA 108 must be corrected. As a result, the manufacturing labor of the fuel cell may increase and the productivity of the fuel cell may fall.

Also, a separate problem of the kind shown in FIG. 13A and FIG. 13B arose.

FIG. 13A and FIG. 13B are explanatory views illustrating an MEA trimming apparatus and trimming process: FIG. 13A is a sectional view showing before the trimming process, and FIG. 13B is a sectional view showing after the trimming process.

In FIG. 13A, first, a PEM 101a (to distinguish it from the post-trimming PEM 101, the reference numeral of the pre-trimming PEM will for convenience be made 101a) with electrodes 102, 103 affixed to its sides is placed on a table 131, and the edges of the PEM 101a are fixed to the table 131 with for example clamping members 132.

Then, from above the PEM 101a, a press apparatus 123 fitted with a trimming blade 122 is lowered as shown with arrows, and the PEM 101a is trimmed by the trimming blade 122.

When the above-mentioned clamping members 132 are used to fix the PEM 101a, when the clamping members 132 are tightened, it sometimes happens that a clamping member 132 moves and makes a crease in the PEM 101a, which is a film-like workpiece, or that clamping members 132 pull on the PEM 101a against each other and stretch the PEM 101a, and the quality of the PEM 101a is impaired.

And, also when the PEM 101a is positioned on the table 131, because it is a film-like workpiece, a method must be used such that it is not damaged.

Also, when metal ions attach to the electrodes 102, 103, these metal ions bond with electrons and metal separates at the carbon electrode. It sometimes happens that because of this, separated metal hinders the reaction between the hydrogen and the oxygen and lowers the performance of the fuel cell, and to improve the performance of the fuel cell it is desirable for the attachment of metal ions to the electrodes 102, 103 to be prevented.

In FIG. 13B, when trimming is finished, the press apparatus 123 is raised as shown with arrows.

It sometimes happens that the MEA 108 made up of the PEM 101 and the electrodes 102, 103, of which trimming is finished, has slipped sideways as shown with a white arrow, and if sideways slipping occurs before trimming is completed, the accuracy of the trimming becomes poor and the quality of the fuel cell is impaired.

Also, the kinds of problem shown in FIG. 14A, FIG. 14B, FIG. 15A and FIG. 15B occurred.

FIG. 14A and FIG. 14B are explanatory views illustrating an MEA trimming apparatus and a trimming blade shape, which has an influence on the trimming process of this trimming apparatus: FIG. 14A is a sectional view showing before the trimming process and FIG. 14B is a sectional view showing trimming in progress.

In FIG. 14A, a PEM 101a having electrodes affixed to its sides is placed on a table 131. Next, from above the PEM 101a, a trimming blade 122 in the blade edge 122a of which undulations have arisen is lowered as shown with a white arrow. (For the purposes of illustration, the degree of undulation in the blade edge 122a has been exaggerated.)

In FIG. 14B, the PEM 101a is trimmed with the trimming blade 122. However, because of the undulations in the blade edge 122a, of the cross-section of the PEM 101a, the parts shown with cross-hatching are not trimmed.

To trim the PEM 101a completely, the trimming blade 122 must be pushed against the PEM 101a with a still larger pushing force, and because the load acting on the trimming blade 122 becomes large, it is necessary to increase the strength of the trimming blade 122 to withstand this load and to make the cylinder apparatus for pushing the trimming blade 122 large.

FIG. 15A and FIG. 15B are explanatory views illustrating an MEA trimming apparatus and a trimming blade inclination, which has an influence on the trimming process of this trimming apparatus: FIG. 15A is a sectional view showing before the trimming process, and FIG. 15B is a sectional view showing trimming in progress.

In FIG. 15A, a PEM 101 with electrodes affixed to its sides is placed on a table 131.

From above the PEM 101a a trimming blade 135 is lowered as shown with a white arrow.

For example, when the parallelness of the upper face of the table 131 and the blade edge 136 of the trimming blade 135 is large (the blade edge 136 is inclined at an angle θ to the upper face of the table 131), in FIG. 15B, when the PEM 101a is trimmed with the trimming blade 135, of the cross-section of the PEM 101a, the part shown with cross-hatching is not trimmed.

Consequently, to trim the PEM 101a, in the same way as that explained with reference to FIG. 14A and FIG. 14B, it is necessary to apply a still larger pushing force to the trimming blade 135.

DISCLOSURE OF THE INVENTION

The present invention, in a first aspect, provides a fuel cell membrane/electrode assembly trimming apparatus for, with a membrane/electrode assembly made by affixing to both sides of a polymer electrolyte membrane carbon electrodes of smaller area than this as the object of trimming, trimming with a trimming blade the edge of the polymer electrolyte membrane, including a lower trimming die on which a membrane/electrode assembly is set and an upper trimming die having a trimming blade and a pressing member ascend/descendably suspended from this upper trimming die, wherein the pressing member is provided with suction-gripping means for suction-gripping and holding one of the carbon electrodes.

By the upper trimming die being integrally provided with a trimming blade and suction-gripping means provided on a pressing member, trimming with the trimming blade can be carried out with the polymer electrolyte membrane pressed down with the pressing member and a carbon electrode suction-gripped by the suction-gripping means, and consequently pressing down and cutting of the polymer electrolyte membrane and suction-gripping of the carbon electrode can be carried out smoothly and swiftly in a single series of operations. Therefore, the productivity of the fuel cell can be raised.

Preferably, the pressing member is provided with a pressing part for pressing down the edge of the polymer electrolyte membrane and a recess for receiving one of the carbon electrodes; an electrode suction hole for suctioning the carbon electrode is provided in the bottom face of this recess; and a membrane suction hole for suctioning the polymer electrolyte membrane is provided in the pressing part. During trimming of the polymer electrolyte membrane, by pressing down the edge of the polymer electrolyte membrane with the pressing part and suctioning the carbon electrode with the electrode suction hole and suctioning the polymer electrolyte membrane with the membrane suction hole, it is possible to prevent sideways slipping of the membrane/electrode assembly and hold the membrane/electrode assembly certainly.

The mechanism for suspending the pressing member on the upper trimming die is preferably made up of guide rods extending between the two members and elastic members urging the pressing member toward the lower trimming die. Because the mechanism for suspending the pressing member from the upper trimming die has guide rods, the pressing member can be raised and lowered with respect to the upper trimming die with good precision.

It is desirable for a porous plate to be fitted to the bottom face of the recess and for the carbon electrode to be suction-gripped using this porous plate. Air inside the recess can be sucked through the porous plate, and compared to a case wherein the carbon electrode is suction-gripped locally with a suction-gripping device, the carbon electrode can be suction-gripped with a substantially uniform suction-gripping force over the whole surface of the porous plate by means of holes distributed over the whole of the porous plate, and there is no damaging of the carbon electrode. Because it is a porous plate, the frictional force between the porous plate and the carbon electrode of when the carbon electrode is suction-gripped can be made large, and the effect preventing sideways slipping of the carbon electrode can be raised still further.

It is desirable, by providing a first bearing member of a larger area than the membrane/electrode assembly on the lower trimming die and a second bearing member for bearing the edge of the polymer electrolyte membrane on this first bearing member, to adopt a structure such that the cutting force of the trimming blade is transmitted in the order of the edge of the polymer electrolyte membrane, the second bearing member, the first bearing member. If a structure is adopted such that the cutting force of the trimming blade is born by a first bearing member and a second bearing member, for example, the material properties of the first bearing member and the second bearing member can be made different. If a difference in hardness is made between the first bearing member and the second bearing member, then when the polymer electrolyte membrane is trimmed with the trimming blade, by deforming the first bearing member or the second bearing member so as to follow the shape of the blade edge of the trimming blade, it is possible to absorb assembly errors of the lower trimming die and the upper trimming die and error of assembly of the trimming blade with respect to the upper trimming die with the first bearing member and the second bearing member.

That is, if the first bearing member or the second bearing member is made relatively hard, relatively small deviations such as dimensional error of the trimming blade itself can be absorbed while the cutting force is certainly transmitted to the polymer electrolyte membrane. If the first bearing member or the second bearing member is made soft, large deviations such as assembly errors of the lower trimming die and the upper trimming die and assembly error of the trimming blade with respect to the lower trimming die can be absorbed. Accordingly, for example by combining the different first bearing member and second bearing member which are different in hardness it is possible to absorb dimensional errors and assembly errors of the aforementioned parts and abut the whole of the trimming blade with the polymer electrolyte membrane, and also it is possible to transmit the cutting force of the trimming blade certainly to the polymer electrolyte membrane, the second bearing member and the first bearing member. Therefore, trimming of the polymer electrolyte membrane can be carried out certainly with a small load.

The first bearing member is preferably made as an elastic body. If the first bearing member is an elastic body, then even when the parallelness of the blade edge of the trimming blade and the lower trimming die side has become large, when the edge of the polymer electrolyte membrane is trimmed with the trimming blade, the first bearing member distorts and the whole of the trimming blade can abut with the polymer electrolyte membrane, and the polymer electrolyte membrane can be cut with the whole of the trimming blade uniformly.

The second bearing member can be made a soft material harder than the first bearing member. If the second bearing member is made a soft material, then even when undulations have arisen in the blade edge of the trimming blade and the blade edge is not straight, when the edge of the polymer electrolyte membrane is trimmed with the trimming blade, the trimming blade can bite into the second bearing member, the whole of the trimming blade abuts with the polymer electrolyte membrane, and the polymer electrolyte membrane can be cut uniformly with the whole of the trimming blade.

In a second aspect, the invention provides a fuel cell membrane/electrode assembly trimming method for, with a membrane/electrode assembly made by affixing to both sides of a polymer electrolyte membrane carbon electrodes of smaller area than this as the object of trimming, trimming with a trimming blade the edge of the polymer electrolyte membrane, wherein a recess with its bottom face made of a nonmetallic plate is provided in the lower trimming die, and after a carbon electrode is received in this recess and positioning of this carbon electrode is effected with two adjacent side walls of the recess, the edge of the polymer electrolyte membrane is suction-gripped to the lower trimming die and the polymer electrolyte membrane is trimmed with the trimming blade.

By fixing the edge of the polymer electrolyte membrane by suction-gripping it to the lower trimming die, there is no risk of the polymer electrolyte membrane, which is a film-like workpiece, being damaged in the trimming of the edge of the polymer electrolyte membrane, and the quality of the membrane/electrode assembly can be improved. By positioning of the carbon electrode being carried out by two adjacent side walls of the recess, positioning can be carried out without damaging the polymer electrolyte membrane and the carbon electrode. Also, by receiving the carbon electrode in a recess having its bottom face constituted by a nonmetallic plate, there is no risk of metal ions attaching to the carbon electrode and the performance of the fuel cell can be improved.

Preferably, the suction-gripping of the polymer electrolyte membrane is carried out on the part which becomes unneeded after trimming of the polymer electrolyte membrane. If after trimming the necessary part of the polymer electrolyte membrane is moved from the lower trimming die to elsewhere, it is possible for only the part of the polymer electrolyte membrane which has become unnecessary to be left on the lower trimming die, and if the suction-gripping of the unnecessary part is stopped, the work of removing the unnecessary part from the lower trimming die can be carried out efficiently.

In a third aspect, the invention provides a fuel cell membrane/electrode assembly trimming apparatus wherein edge-trimming of a membrane/electrode assembly, made by affixing to both sides of a polymer electrolyte membrane carbon electrodes of smaller area that this, is carried out at a trimming station. For stacking of this edge-trimmed membrane/electrode assembly, the membrane/electrode assembly is carried from the trimming station to a stacking station, including a slider which moves from the trimming station to the stacking station, an arm extending from this slider, an upper trimming die that is suspended from this arm and has a trimming blade for the trimming, arm moving means for moving the arm, and a pressing member attached to the upper trimming die for suction-gripping one of the carbon electrodes and holding it so that it does not slip sideways.

If a structure is adopted wherein a pressing member for suction-gripping and holding a carbon electrode is mounted to an upper trimming die for edge-trimming a membrane/electrode assembly and the membrane/electrode assembly is suction-gripped with the pressing member from the time of trimming to the time of carrying, the membrane/electrode assembly can be carried from a trimming station to a stacking station still in its state of the time of trimming, without it slipping sideways. As a result, when the membrane/electrode assembly is stacked with a separator at the stacking station, deviation of the stacking position of the membrane/electrode assembly can be prevented. Consequently, when the membrane/electrode assembly is stacked, it is not necessary for the position of the membrane/electrode assembly to be corrected, and a smooth transition can be made from the carrying step to the stacking step.

The arm moving means preferably includes a vertical movement mechanism for moving the arm in the vertical direction and a horizontal movement mechanism for moving the arm horizontally and in a straight line. If a vertical movement mechanism and a horizontal movement mechanism are provided, the movement of the arm becomes rectilinear movement in each of two directions, the vertical direction and a horizontal direction; the movement distance of the arm becomes short; and the carrying time can be shortened. Accordingly, the productivity of the fuel cell can be improved. By making the horizontal movement rectilinear, compared to a mechanism wherein the horizontal movement is for example planar, the arm moving means can be made a simple structure. Also, because the movement direction is two directions, the force acting on the membrane/electrode assembly can be made a fixed direction at all times; it can be made difficult for shocks to act on the membrane/electrode assembly being carried; and sideways slipping of the membrane/electrode assembly in carriage can be prevented.

BEST MODES FOR CARRYING OUT THE INVENTION

Figure 1:
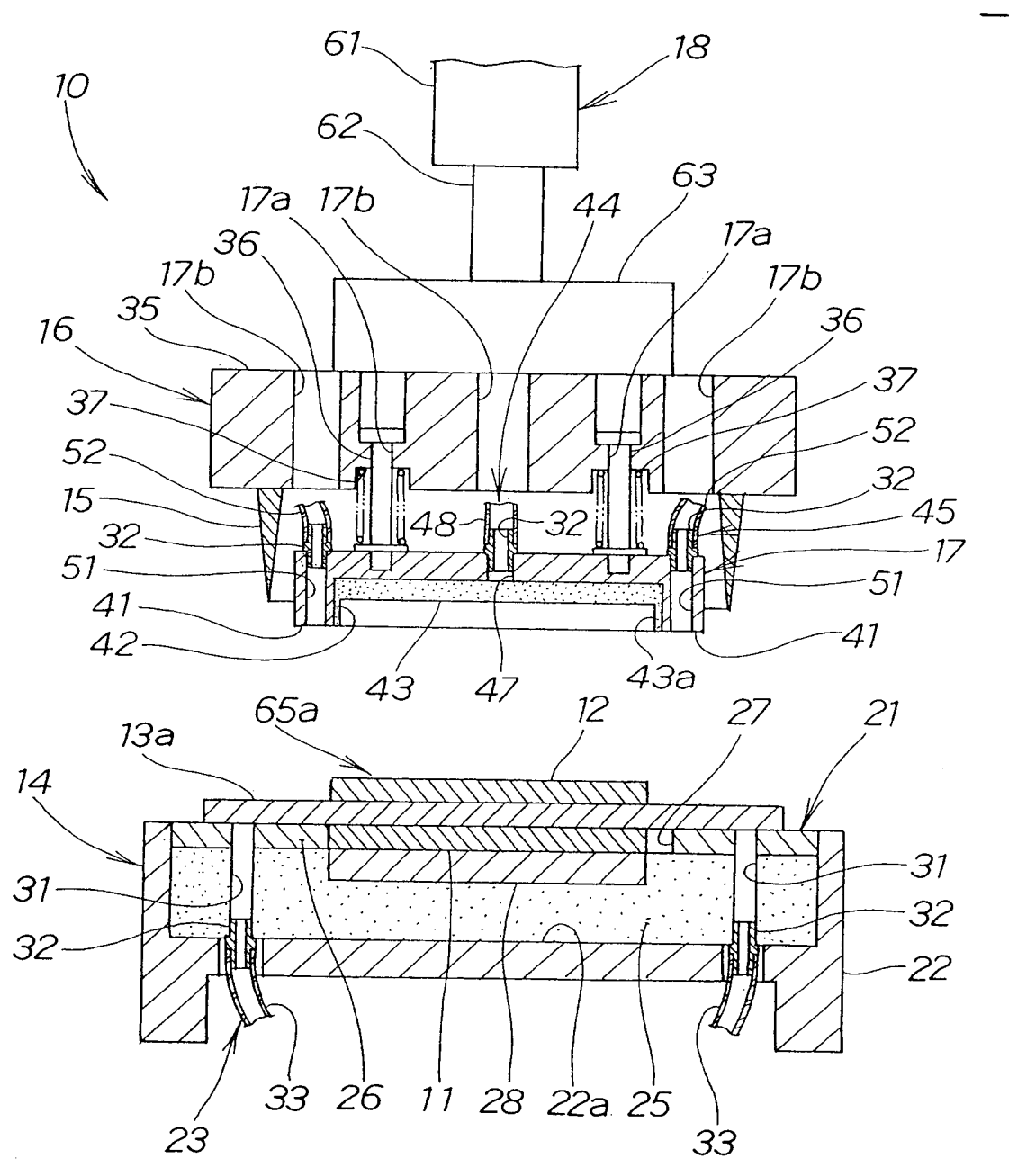
FIG. 1 is a sectional view of a fuel cell membrane/electrode assembly trimming apparatus according to the invention.

As shown in FIG. 1, a membrane/electrode assembly trimming apparatus 10 (hereinafter written "MEA trimming apparatus 10") constituting a trimming station is made up of a lower trimming die 14, on which is placed a polymer electrolyte membrane 13a (hereinafter written "PEM 13a"; the pre-trimming PEM will be written PEM 13a like this to distinguish it from a post-trimming PEM 13, which will be further discussed later) having carbon electrodes 11, 12 made of carbon paper press-affixed to both its sides; an upper trimming die 16, having a trimming blade 15 for cutting off the edges of, i.e. trimming, the PEM 13a; a suction-gripping/holding device 17 serving as a pressing member connected to the upper trimming die 16 for suction-gripping and holding the carbon electrode 12 and the PEM 13a, and a cylinder device 18 for lowering the upper trimming die 16.

The lower trimming die 14 is made up of a table part 21, which doubles as a part for positioning the PEM 13a; a lower die support part 22, which supports this table part 21; and a lower die suction-gripping part 23, which suction-grips the periphery of the PEM 13a.

The table part 21 is made up of a lower bearing member 25, serving as a first bearing part provided on a bottom part 22a of the lower die support part 22, and an upper bearing member 26, serving as a second bearing member disposed on top of this lower bearing member 25, on which the PEM 13a is placed. A positioning receiving part 27 constituting a recess for positioning the carbon electrode 11 is provided in the middle of the upper bearing member 26, and a resin plate 28 serving as a nonmetallic plate is disposed in the top of the lower bearing member 25 and below the positioning receiving part 27.

The lower bearing member 25 is made of a foam-form elastic material such as polyurethane, and the upper bearing member 26 is made of a soft material such as PET (polyethylene terephthalate). The resin plate 28 is a member for preventing the carbon electrode 11 from making contact with the lower bearing member 25, so that when metal ions are attached to the lower bearing member 25 the metal ions do not attach to the carbon electrode 11.

If metal ions attach to the carbon electrode 11, these metal ions combine with electrons and metal separates at the carbon electrode 11. It sometimes happens that because of this, separated metal hinders the reaction between the hydrogen and the oxygen and lowers the performance of the fuel cell.

The lower die suction-gripping part 23 is made up of suction openings 31 provided in the table part 21 and connecting pipes 33 severally connected to these suction openings 31 by way of joints 32, and by connecting these connecting pipes 33 to an aspirator not shown in the figures, air is drawn through the suction openings 31 and the PEM 13a is suction-gripped.

The trimming blade 15 is approximately rectangular in plan view and is a member for cutting off the edge of the PEM 13a on the outside of the carbon electrodes 11, 12.

The upper trimming die 16 is made up of the trimming blade 15 and a trimming blade mounting part 35 to which this trimming blade 15 is mounted.

The suction-gripping/holding device 17, to press down upon and position the PEM 13a for trimming of the PEM 13a and prevent sideways slipping of the PEM 13a during carrying after trimming, is connected to the trimming blade mounting part 35 by rods 36 serving as guide rods and is pressed downward by springs 37 serving as elastic members interposed between itself and the trimming blade mounting part 35, and is made up of a pressing part 41 for pressing down upon the PEM 13a during trimming, a first recess part 42 provided inward of this pressing part 41, a pad 43 serving as a porous plate made of a porous material disposed inside this first recess part 42, a first upper die suction-gripping part 44 serving as suction-gripping means for suction-gripping the carbon electrode 12 by way of this pad 43, and second upper die suction-gripping parts 45 for suction-gripping the PEM 13a at the position of the pressing part 41. 17a denotes guide holes provided in the trimming blade mounting part 35 for guiding the rods 36; 17b denotes through holes for connecting pipes 48, 52 to pass through; and 43a is a second recess provided in the lower part of the pad 43 for receiving the carbon electrode 12.

The pad 43 is made of a porous resin material and has gas permeability, and moreover is also for preventing metal ions from attaching to the carbon electrode 12, like the resin plate 28 of the lower trimming die 14 described above.

The first upper die suction-gripping part 44 is made up of a suction-gripping hole 47 serving as an electrode suction hole provided in the bottom of the first recess part 42 and a connecting part 48 connected to this suction hole 47 by a joint 32, and by connecting this connecting part 48 to an aspirator not shown in the figures air inside the first recess part 42 is drawn through the pad 43 and the suction-gripping hole 47 to suction-grip the carbon electrode 12.

The second upper die suction-gripping part 45 is made up of suction-gripping holes 51 serving as membrane suction holes provided in the pressing part 41 and connecting pipes 52 severally connected to these suction-gripping holes 51 by way of joints 32, and by connecting these connecting pipes 52 to an aspirator not shown in the figures air is drawn through the suction-gripping holes 51 to suction-grip the PEM 13.

The cylinder device 18 is made up of a cylinder proper 61; a piston, not shown in the figure, movably received in this cylinder proper 61; a piston rod 62 attached to this piston; and a pressing part 63 attached to the lower end of this piston rod 62.

The main points of the manufacture of a fuel cell including an MEA trimming process carried out by the MEA trimming apparatus 10 described above will be described next.

Figure 2:
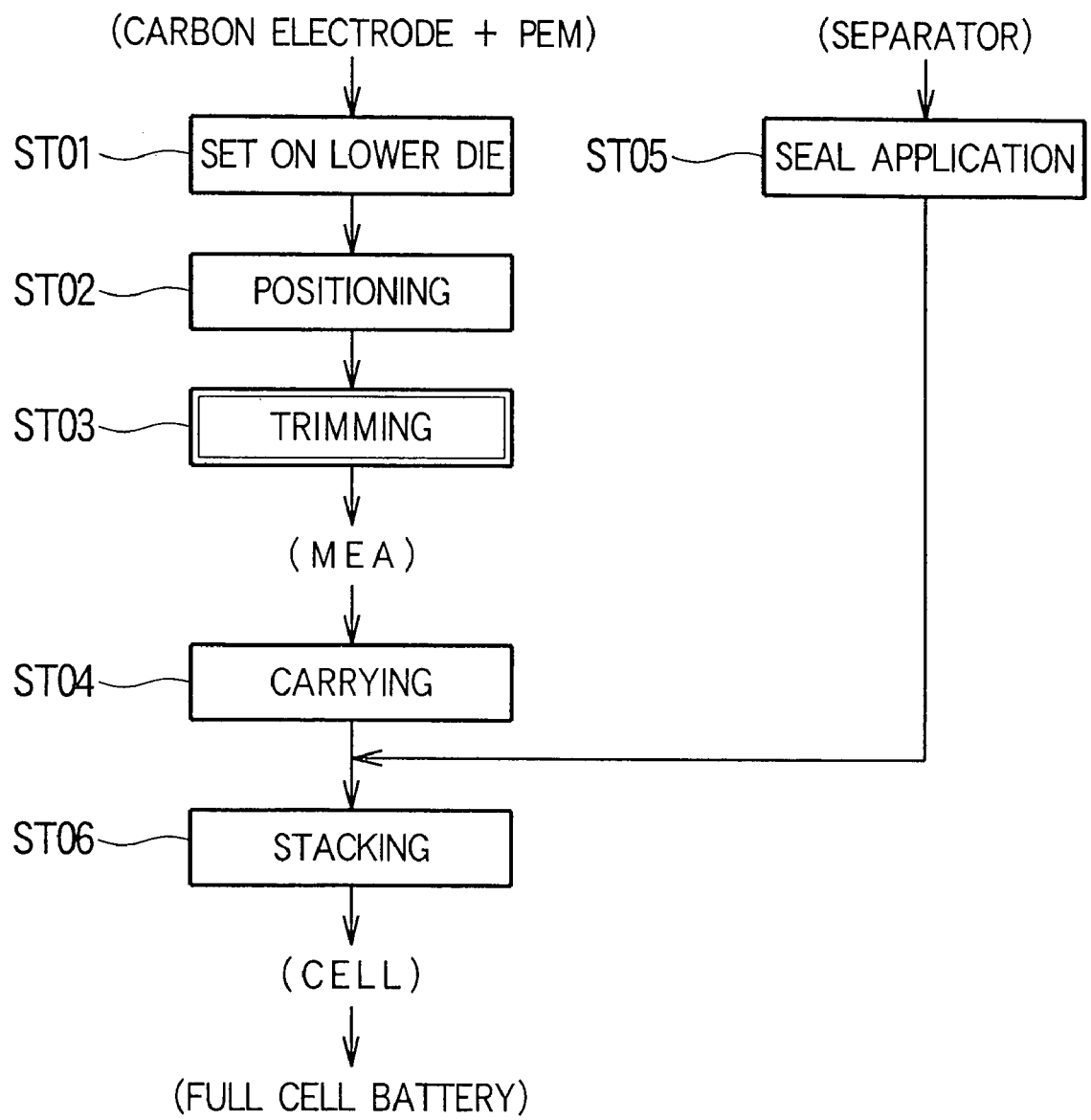
FIG. 2 is a flowchart of manufacturing of a fuel cell including a trimming process carried out by an MEA trimming apparatus according to the invention.

Next, a flow of manufacture of a fuel cell battery cell including a trimming process carried out by an MEA trimming apparatus according to the invention will be described, with reference to FIG. 2. STxx means Step.

ST01: A PEM with carbon electrodes affixed to it is set on a lower trimming die.

ST02: The PEM is positioned.

ST03: The PEM is trimmed to make an MEA.

ST04: The MEA is carried to a stacking station.

ST05: A sealing material is applied to separators.

ST06: The separators with the sealing material applied and the MEA are stacked to make a cell. By stacking multiple cells like this, a fuel cell battery with a required voltage is obtained.

The above-mentioned steps ST01 to ST03 will now be described in detail, with reference to FIG. 3A to FIG. 3C.

Figure 3A:
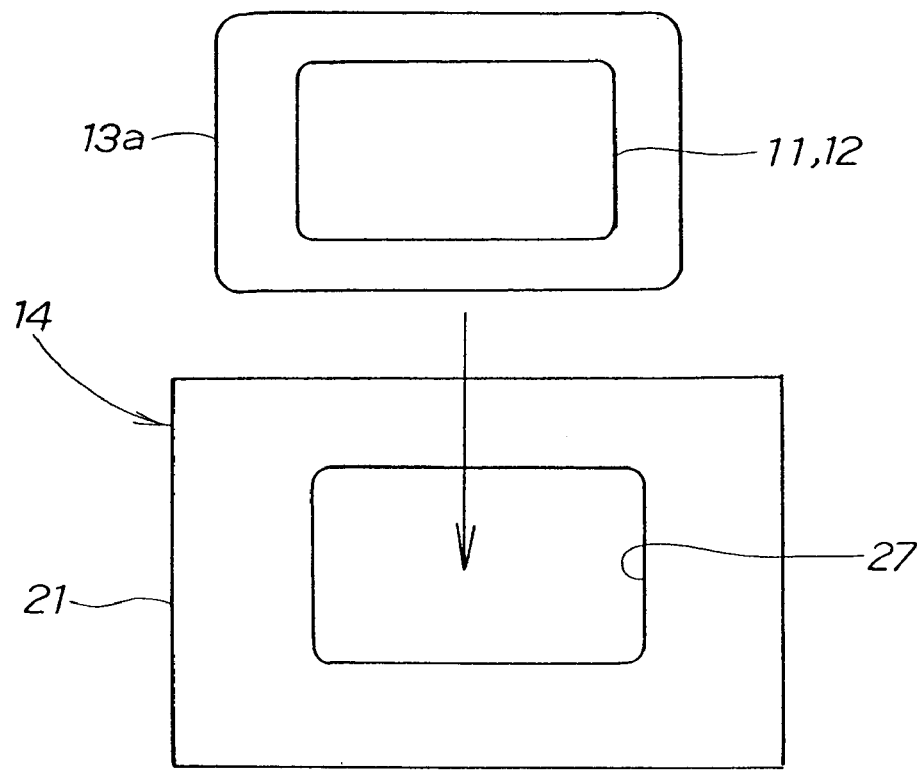
FIG. 3A to FIG. 3C are views illustrating positioning of a PEM on an MEA trimming apparatus according to the invention, FIG. 3A and FIG. 3B being plan views and FIG. 3C being a sectional view on the line c—c in FIG. 3B.

First, in FIG. 3A, a PEM 13a with carbon electrodes 11, 12 (the carbon electrode 11 is on the back side of the PEM 13a) affixed to it is placed on the table part 21 of the lower trimming die 14.

Figure 3B:
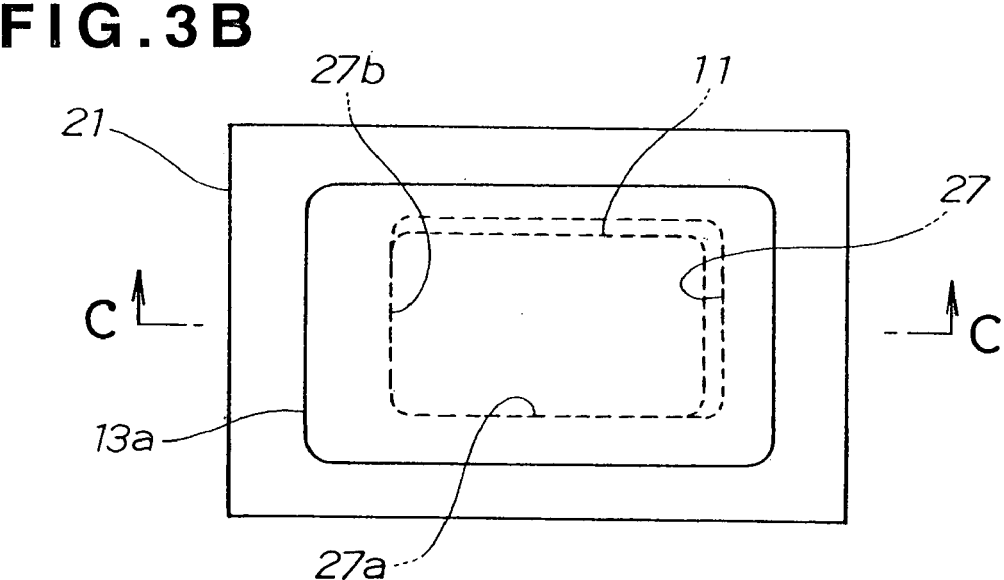
Figure 3C:
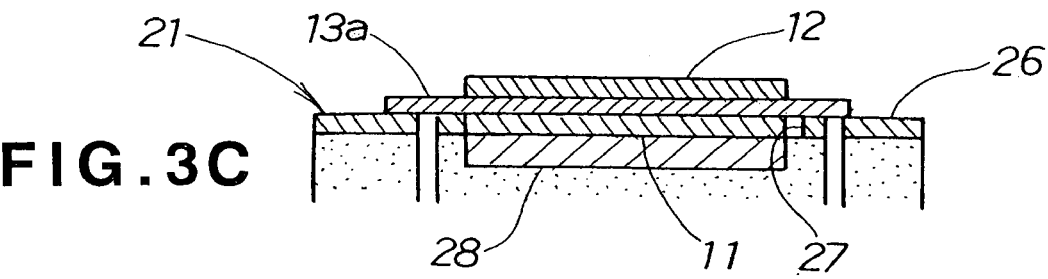

In FIG. 3B and FIG. 3C, two sides of the carbon electrode 11 are abutted with two side walls 27a, 27b of the positioning receiving part 27 of the table part 21 to effect positioning of the carbon electrode 11 with respect to the table part 21, that is, positioning of the PEM 13a with respect to the table part 21. (In FIG. 3B, for convenience of description, the carbon electrode 12 is not shown.)

By positioning of the carbon electrode 11 being effected with two adjacent side walls 27a, 27b of the positioning receiving part 27 like this, positioning can be carried out without damaging the PEM 13a and the carbon electrode 11 and simply and furthermore exactly.

Next, the operation of the PEM trimming process carried out by an MEA trimming apparatus according to the invention will be described, with reference to FIG. 4A and FIG. 4B.

Figure 4A:
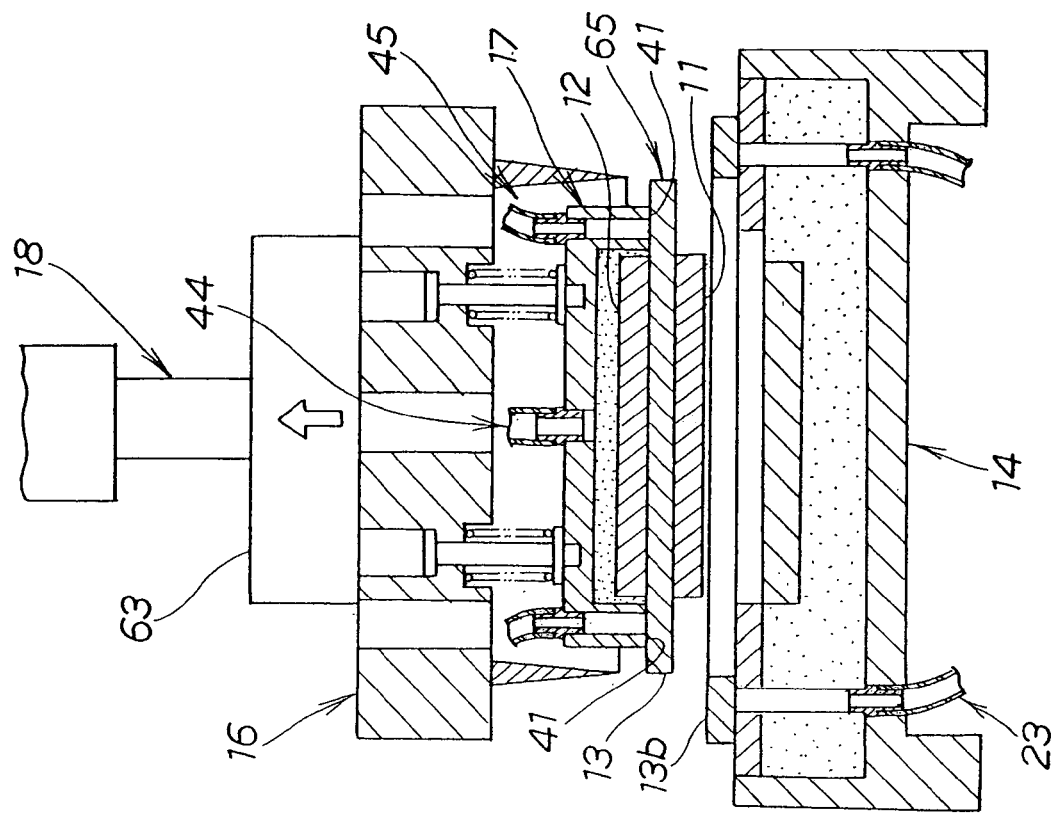
FIG. 4A and FIG. 4B are views illustrating a PEM trimming process carried out by an MEA trimming apparatus according to the invention, FIG. 4A being a sectional view showing a trimming process and FIG. 4B a sectional view showing a suction-gripping operation.

After positioning of the PEM 13a with respect to the table part 21 is carried out as shown in FIG. 3, suction-gripping of the periphery of the PEM 13a by the lower die suction-gripping part 23 shown in FIG. 1 is started, and in this suction-gripping state the cylinder device 18 is operated and from the state of FIG. 1 the pressing part 63 of the cylinder device 18 is lowered as shown in FIG. 4A and the trimming blade mounting part 35 of the upper trimming die 16 is pressed downward.

As a result of this, the carbon electrode 12 is received in the second recess 43a, the PEM 13a is pressed down with the elastic force of the springs 37 by the pressing part 41 of the suction-gripping/holding device 17, and after this the edge of the PEM 13a is trimmed by the trimming blade 15.

Here, the MEA before the edge is trimmed will be written MEA 65a (see FIG. 4A), and the assembly of the PEM 13 with its edge trimmed and the carbon electrodes 11, 12 will be called the membrane/electrode assembly 65, or MEA 65.

During trimming and after trimming of the edge of the PEM 13a, the carbon electrode 12 is suction-gripped by the first upper die suction-gripping part 44 and the PEM 13a is suction-gripped by the second upper die suction-gripping parts 45.

At this time, when the carbon electrode 12 is suction-gripped by the first upper die suction-gripping part 44 by way of the pad 43, a force due to the suction shown by the arrow N (this force will be called the force N) acts on the upper face of the carbon electrode 12, and when in this state the carbon electrode 12 tends to slip sideways over the surface of the pad 43, between the carbon electrode 12 and the pad 43 a frictional force F1 or a frictional force F2 shown by the arrow F1 or the arrow F2 arises due to the force N.

That is, a frictional force arises in the opposite direction to the movement direction of the carbon electrode 12, so that if the carbon electrode 12 tends to slip sideways to the right with respect to the pad 43 a frictional force F1 arises, and if the carbon electrode 12 tends to slip sideways to the left a frictional force F2 arises.

In this way, by the frictional force F1 or the frictional force F2 described above, sideways slipping of the carbon electrode 12 and hence the MEA 65a during trimming can be prevented. Thus the trimming precision can be raised, and the quality of the fuel cell can be improved.

Figure 4B:
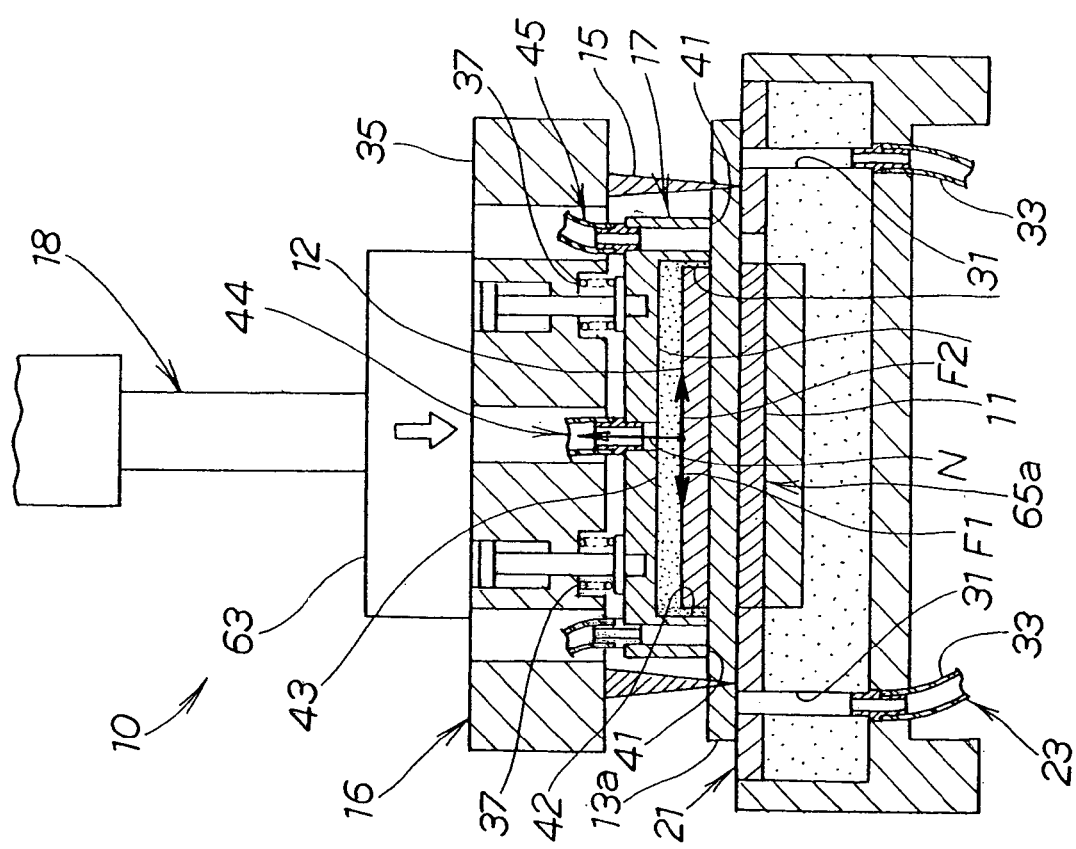

After the trimming of the edge of the PEM 13a, as shown in FIG. 4B, the pressing part 63 of the cylinder device 18 is raised and the upper trimming die 16 is thereby raised. At the first upper die suction-gripping part 44 and the second upper die suction-gripping parts 45, suction-gripping for carrying the carbon electrodes 11, 12 and the PEM 13 continues, and they are carried to a stacking station (not shown).

As shown in the above-mentioned FIG. 4A and FIG. 4B, if sideways slipping of the MEA 65a can be prevented in the MEA trimming apparatus 10, then when the MEA 65 is carried from this trimming step to the next step, for example a stacking step in which the MEA 65 is stacked with separators, until the stacking station, which is a predetermined distance away from the MEA trimming apparatus 10, by controlling it to move over that distance with good precision, positioning of the MEA 65 at the stacking station can be carried out with good accuracy even without positioning being carried out especially at the stacking station.

The frame-shaped piece 13b cut from the PEM 13 and become unneeded is removed from the lower trimming die 14 after suction-gripping by the lower die suction-gripping part 23 is stopped.

In related art, because suction-gripping of the frame-shaped piece 13b has not been carried out, it has happened that when the MEA 65 is moved from the lower trimming die 14, the frame-shaped piece 13b moves together with the MEA 65 or scatters to positions away from the lower trimming die 14, and its removal has consequently been troublesome. In this embodiment, by suction-gripping the frame-shaped piece 13b, the frame-shaped piece 13b can be held in a fixed location at all times, and if the suction-gripping of the PEM 13a is stopped, the operation of removing the frame-shaped piece 13b from the lower trimming die 14 can be carried out efficiently.

Figure 5:
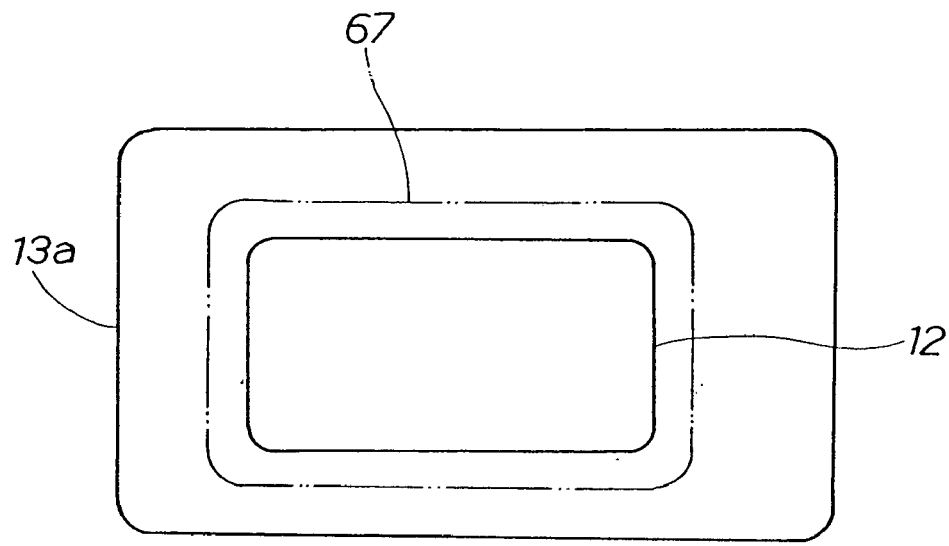
FIG. 5 is a view illustrating a PEM trimming position of an MEA trimming apparatus according to the invention.

In FIG. 5, the PEM 13a is trimmed with the trimming blade 15 of FIG. 4A at the position shown with a broken line 67. This trimming position is a part on the outer side of the profile of the carbon electrodes 11, 12 (the carbon electrode 11 on the back side is not shown in the figure).

Figure 6:
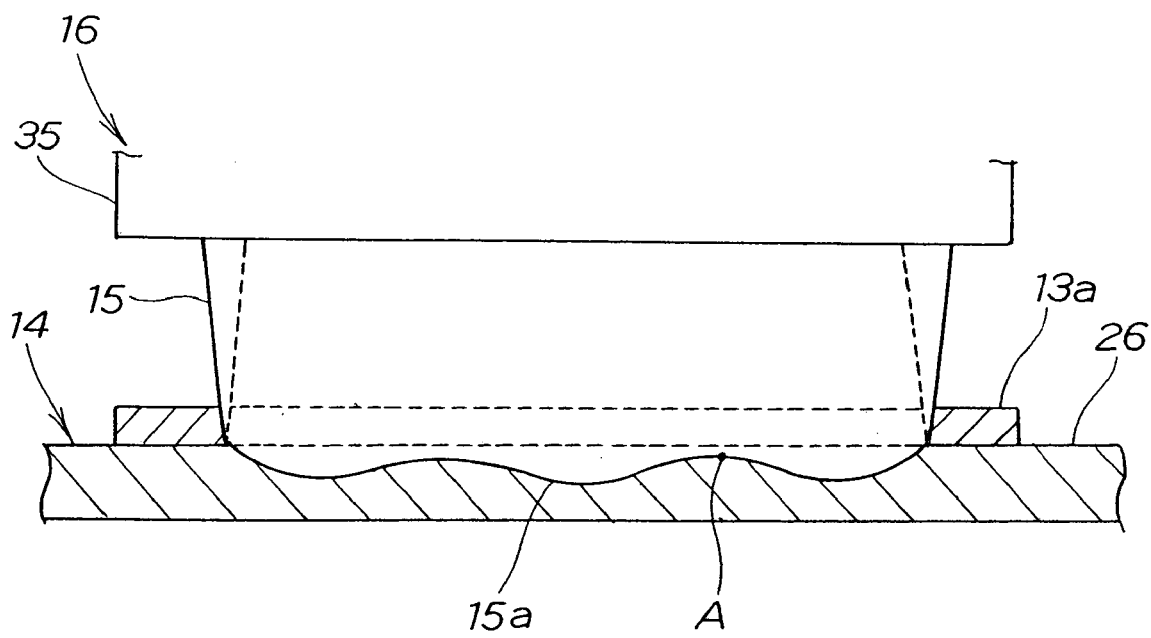
FIG. 6 is a view illustrating a trimming process in which consideration has been given to the trimming blade shape of an MEA trimming apparatus according to the invention.

In FIG. 6, when the edge of the PEM 13a is trimmed, even if for example undulations have formed in the blade edge 15a of the trimming blade 15, because the upper bearing member 26 of the lower trimming die 14 is made of a soft material, the blade edge 15a of the trimming blade 15 bites into the upper bearing member 26, and the uppermost part of the undulations of the blade edge 15a, for example point A, can be brought to below the underside of the PEM 13a, and the PEM 13a can be cut with the whole of the blade edge 15a. Therefore, the PEM 13a can be trimmed certainly even with a relatively light load.

Figure 7A:
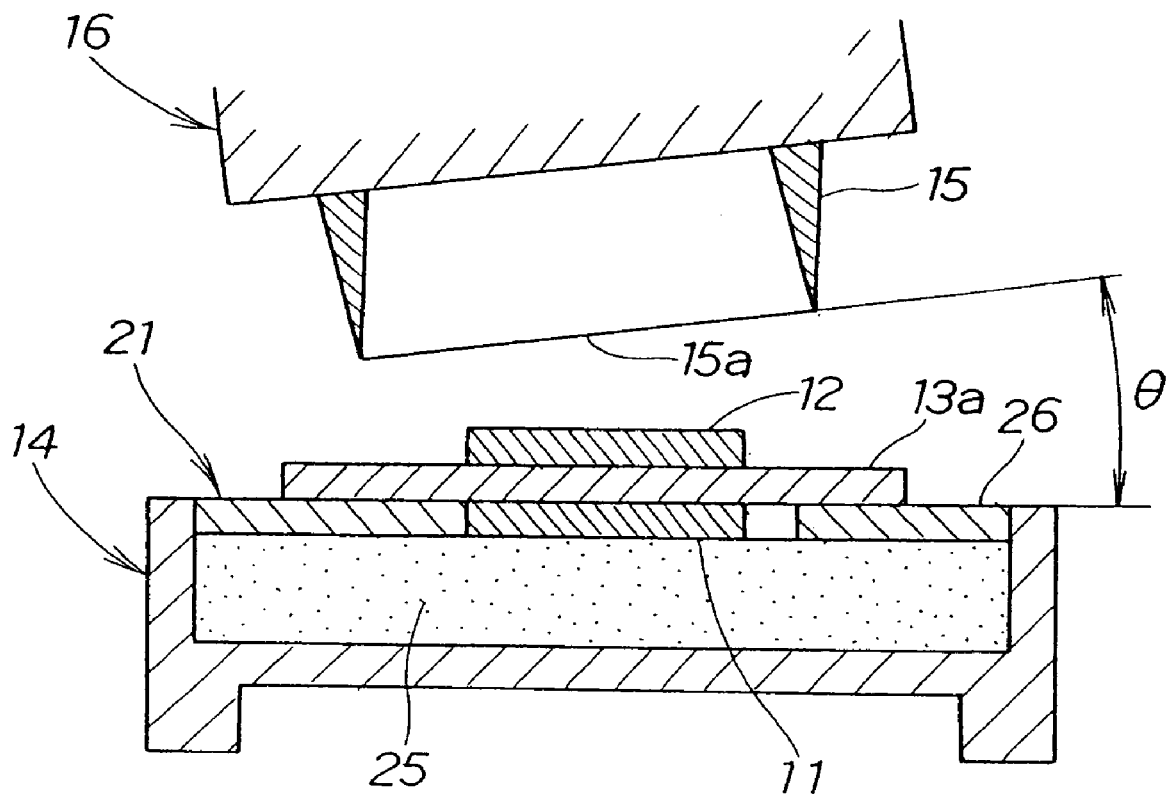
FIG. 7A and FIG. 7B are action views illustrating the action of a trimming process in which consideration has been given to the inclination of the trimming blade of an MEA trimming apparatus according to the invention, FIG. 7A being a sectional view showing before the trimming process and FIG. 7B a sectional view showing the trimming process.
Figure 7B:
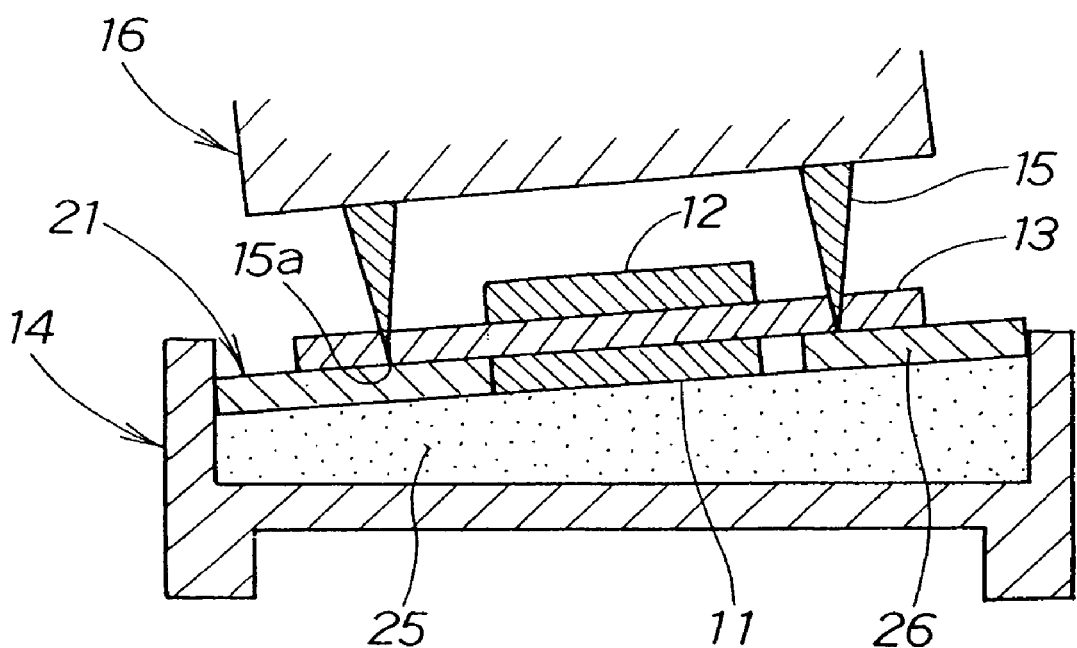

In FIG. 7A, for example when the blade edge 15a of the trimming blade 15 of the upper trimming die 16 is inclined by an angle θ to the upper face of the table part 21 of the lower trimming die 14 (the upper face of the upper bearing member 26) and the blade edge 15a is straight, that is, when the parallelness of the table part 21 and the blade edge 15a of the trimming blade 15 is large, as shown in FIG. 7B, when the PEM 13a is trimmed, the compression of the lower bearing member 25, which is an elastic body, locally becomes large, and the respective upper faces of the upper bearing member 26 and the PEM 13a follow the blade edge 15a of the trimming blade 15, and the blade edge 15a abuts with the whole face of the PEM 13a. Consequently, the PEM 13a can be trimmed certainly with a small load.

Because a large load does not act on the trimming blade 15, as is clear from FIG. 6, FIG. 7A and FIG. 7B, friction on the trimming blade 15 can be suppressed. Because the strength of the various components of the MEA trimming apparatus 10 (see FIG. 1) only needs to be small, and there is no need for the cylinder device 18 (see FIG. 1) for pushing down the trimming blade 15 to be made large, the manufacturing cost of the MEA trimming apparatus 10 can be reduced.

Figure 8:
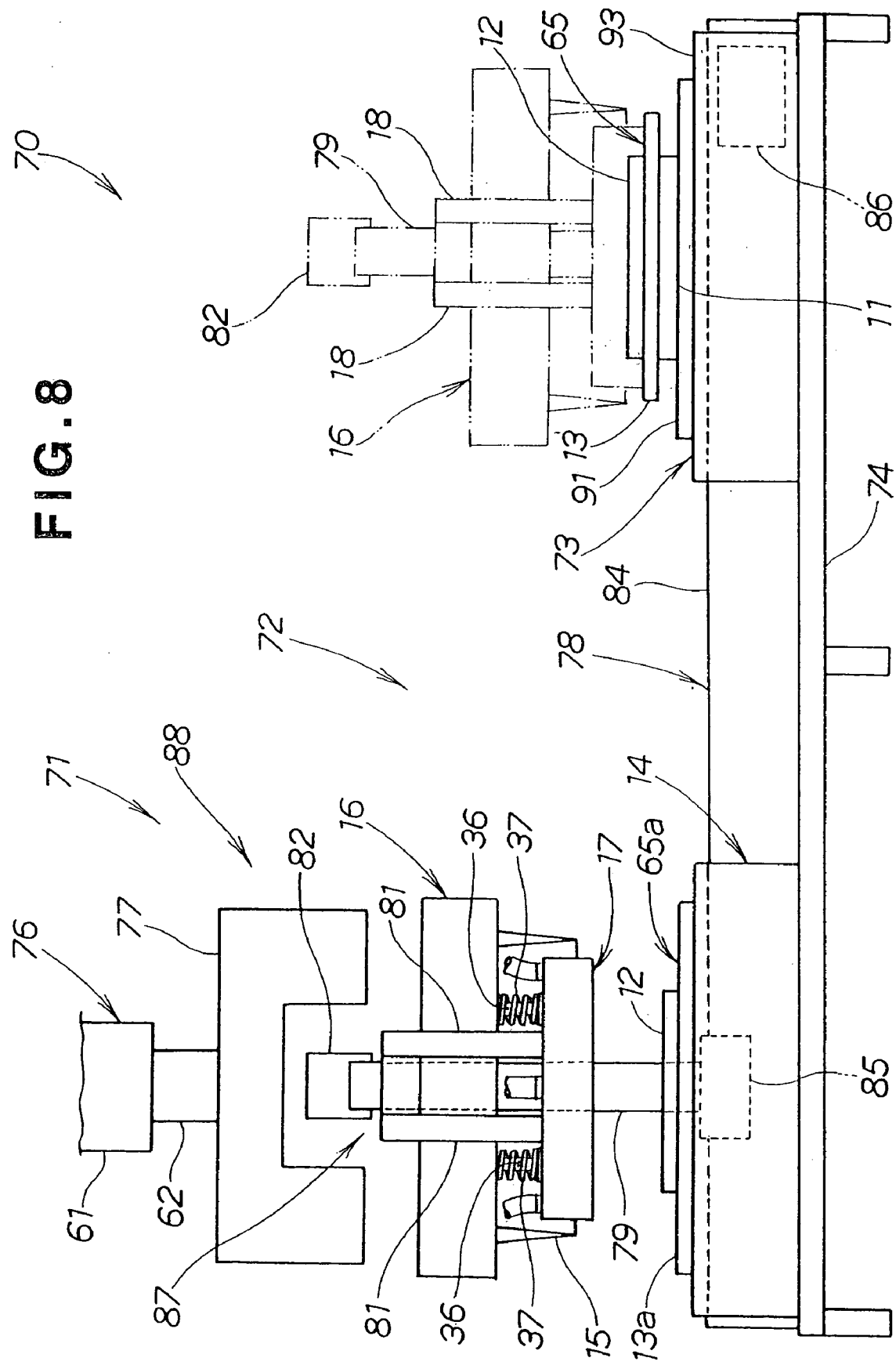
FIG. 8 is a front view of a fuel cell manufacturing apparatus having a MEA trimming apparatus and an MEA carrying apparatus according to the invention.

As shown in FIG. 8, a fuel cell manufacturing apparatus 70 is made up of an MEA trimming apparatus 71 constituting a trimming station, an MEA carrying apparatus 72, a stacking part 73 constituting a stacking station, and a base part 74 on which these are set. The MEA trimming apparatus 71 is different from the MEA trimming apparatus 10 shown in FIG. 1 in a part of its construction, but its basic structure is the same, and the same parts have been given the same reference numerals and a detailed description of them will be omitted.

The MEA trimming apparatus 71 is made up of a lower trimming die 14, an upper trimming die 16, a suction-gripping/holding device 17 serving as suction-gripping/holding means, and a cylinder device 76 for lowering the upper trimming die 16.

The cylinder device 76 is made up of a cylinder proper 61, a piston not shown in the figure, a piston rod 62, and a pressing part 77 attached to the lower end of this piston rod 62.

The upper trimming die 16 floats on the suction-gripping/holding device 17 by way of rods 36 and springs 37.

The MEA carrying apparatus 72 is made up of a slider 78 serving as a horizontal movement mechanism for moving from the position of the MEA trimming apparatus 71 to the stacking part 73; arms 81, 81 attached to this slider 78 by a post 79; and an arm raising/lowering motor 82 for raising and lowering these arms 81, 81.

The stacking part 73 has a stacking table 93, which is a table for stacking a separator 91 and an MEA 65 upon, and is provided with a positioning part, not shown in the figure, for positioning a separator 91 on this stacking table 93.

The slider 78 is made up of a rail part 84 laid on a base 74; a moving body 85 which moves on this rail part 84; and a horizontal drive motor 86, which constitutes a drive source of this moving body 85.

The arms 81 suspend the upper trimming die 16 by way of the suction-gripping/holding device 17.

The arm raising/lowering motor 82 is mounted on an upper rear part of the post 79.

The post 79, the arms 81 and the arm raising/lowering motor 82 constitute a vertical movement mechanism 87.

And, the arm raising/lowering motor 82 and the horizontal drive motor 86 constitute arm moving means 88.

Figure 9:
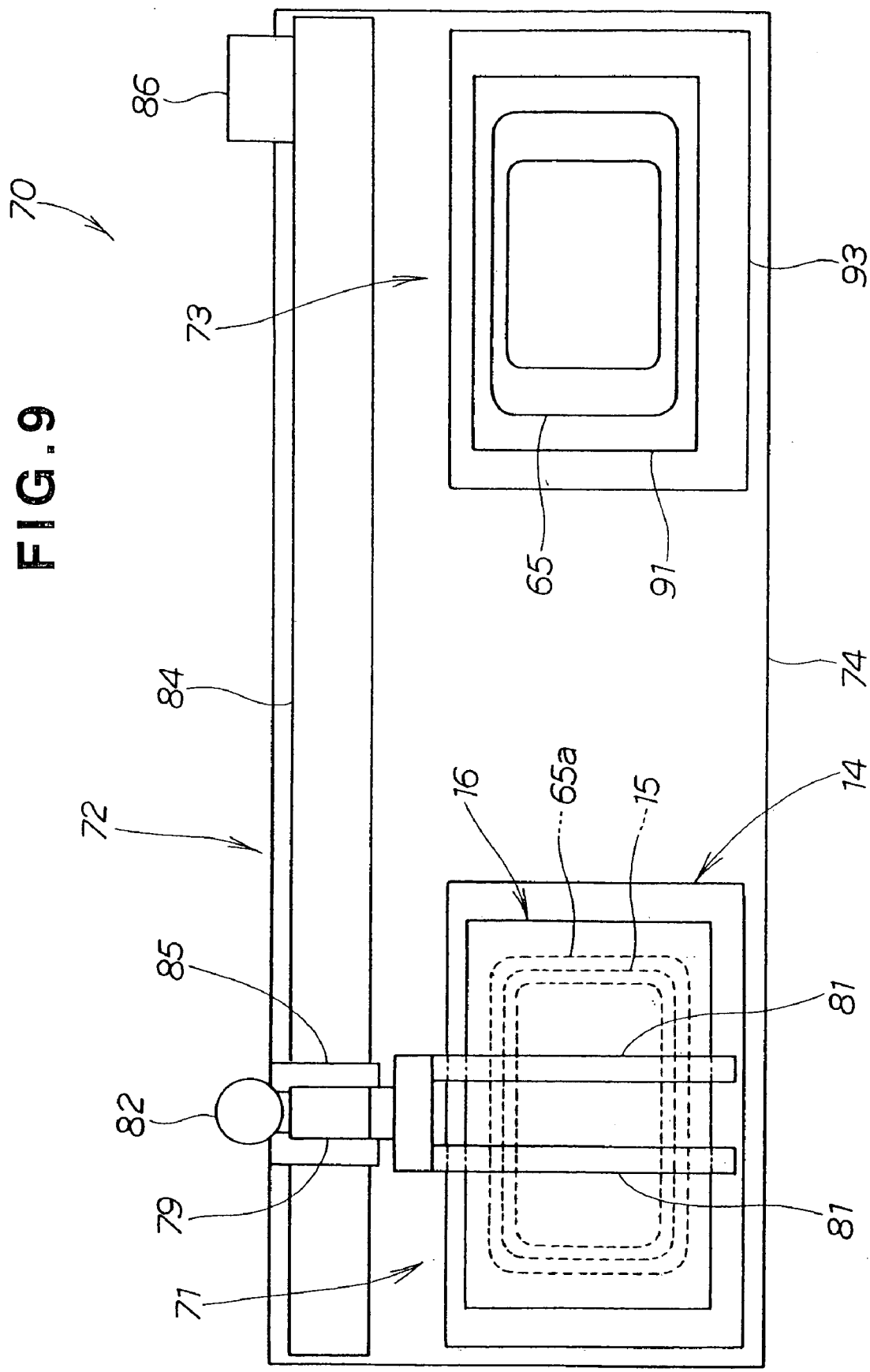
FIG. 9 is a plan view of a fuel cell manufacturing apparatus having an MEA trimming apparatus and an MEA carrying apparatus according to the invention.

Referring to FIG. 9, the arm raising/lowering motor 82 is mounted on the back of the post 79, and the horizontal drive motor 86 is mounted on the back of an end part of the rail part 84. The output shaft of the arm raising/lowering motor 82 is connected to the arms 81, 81 by a feed mechanism made up of a feed screw and a nut. The output shaft of the horizontal drive motor 86 is connected to the moving body 85 by a feed mechanism made up of a feed screw and a nut.

Figure 10:
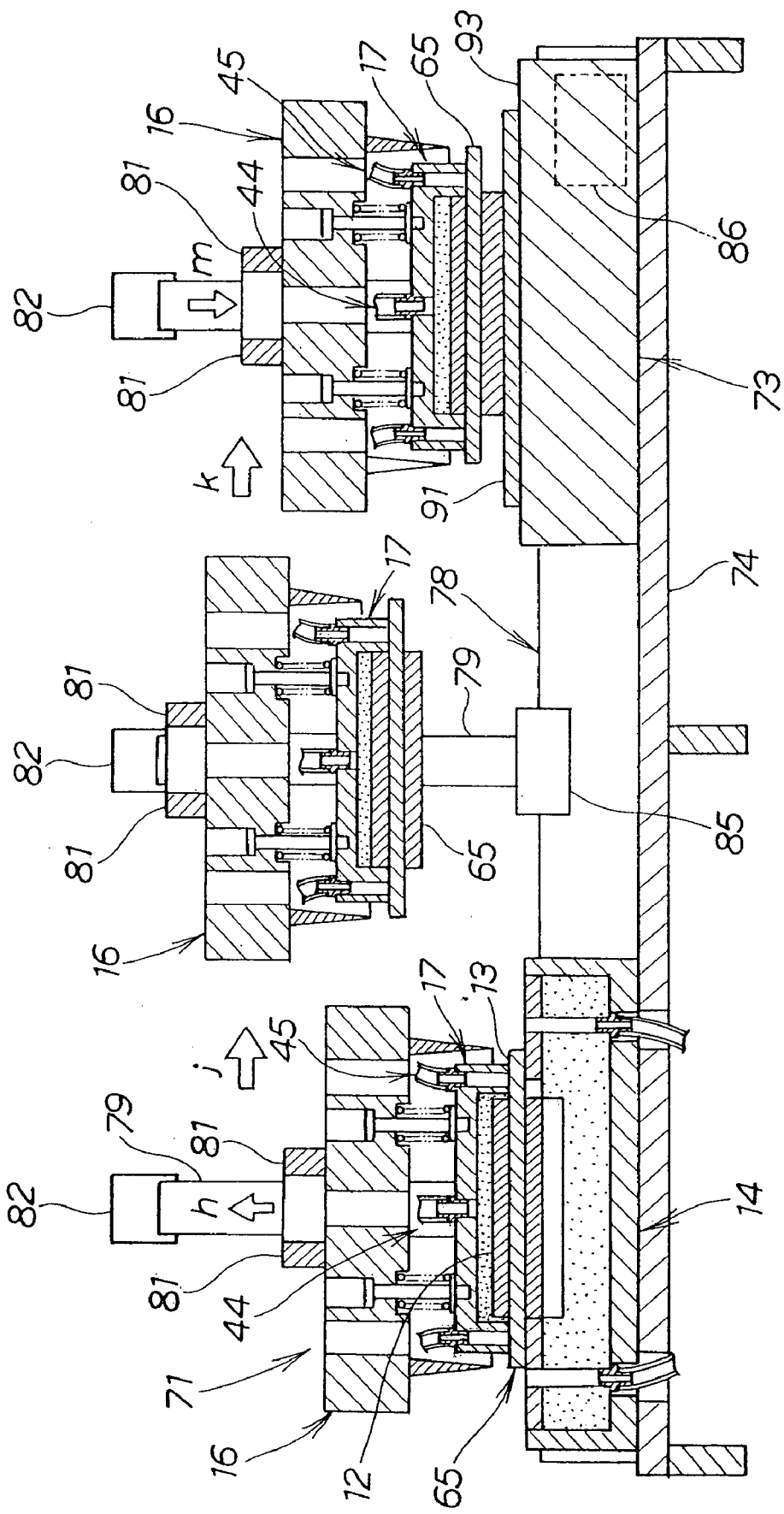
FIG. 10 is a view illustrating the operation of an MEA carrying apparatus according to the invention.
Figure 11:
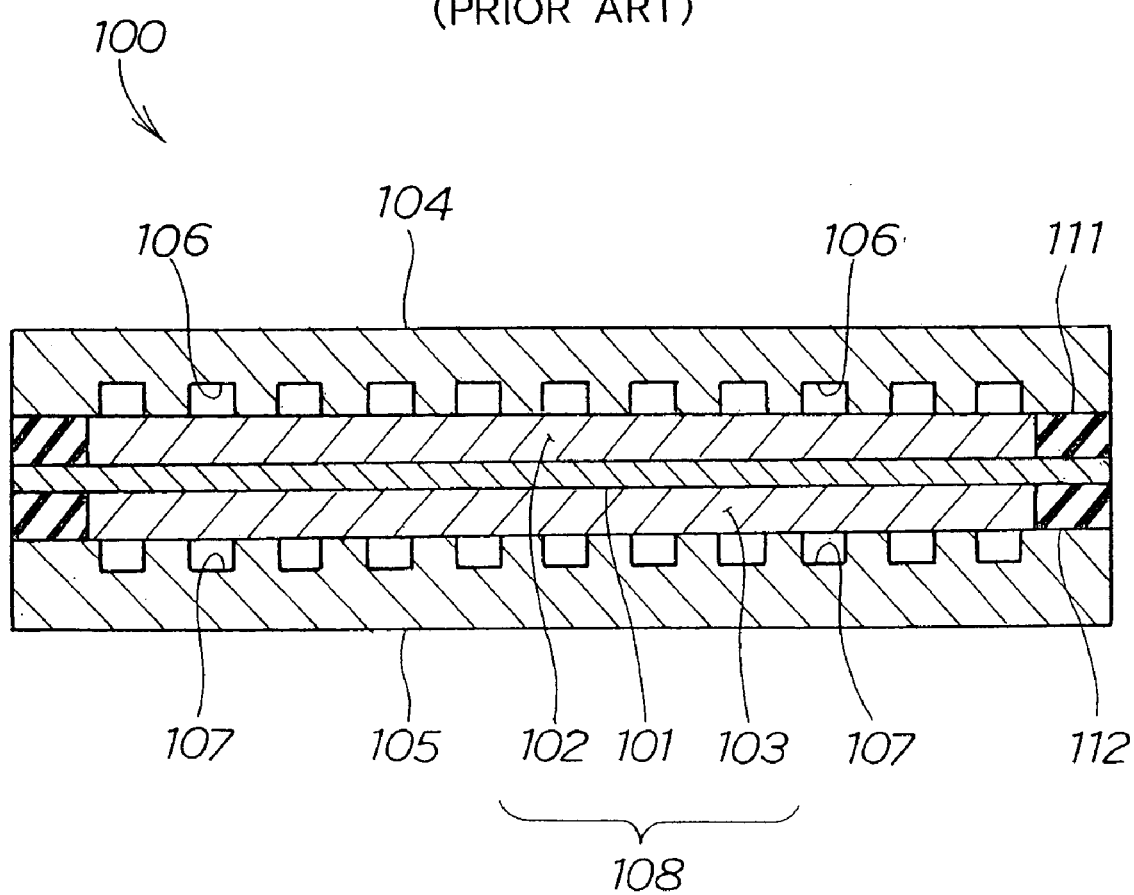
FIG. 11 is a sectional view of a cell of a fuel cell battery.
Figure 12C:
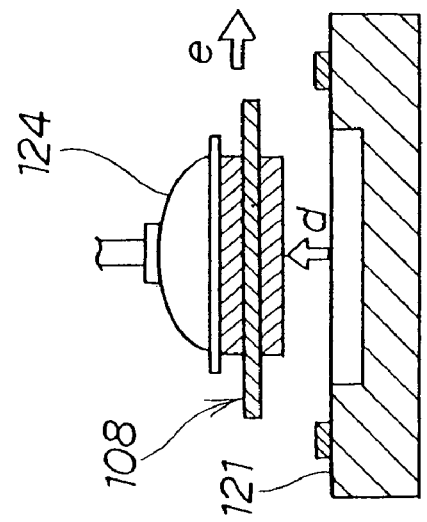
FIG. 12A to FIG. 12C are explanatory views illustrating an MEA trimming step and a carrying step which follows this MEA trimming step, FIG. 12A being a sectional view showing a trimming process, FIG. 12B a sectional view showing a suction-gripping operation and FIG. 12C a sectional view showing a carrying operation.
Figure 12B:
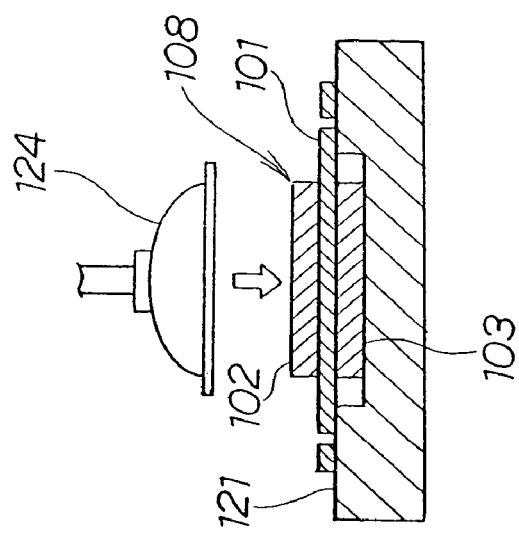
Figure 12A:
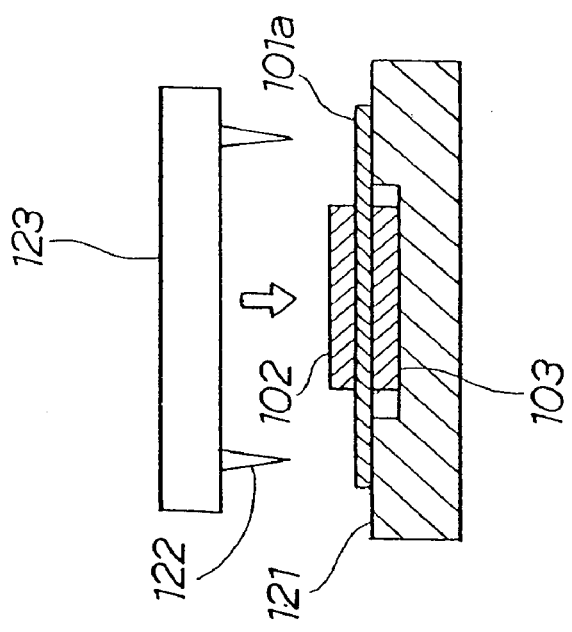
Figure 13A:
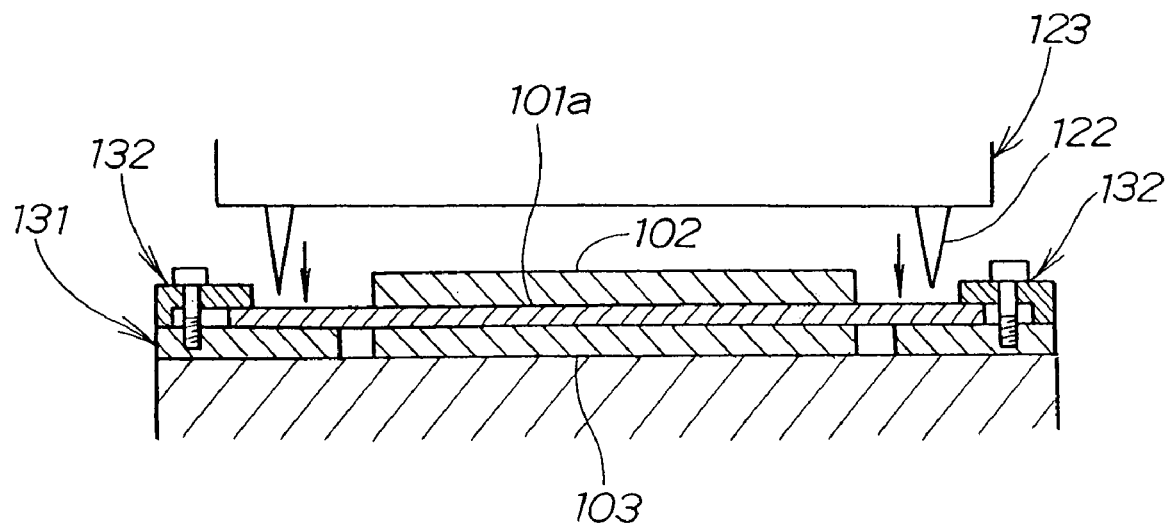
FIG. 13A and FIG. 13B are explanatory views illustrating an MEA trimming apparatus-and trimming process, FIG. 13A being a sectional view showing before the trimming process and FIG. 13B a sectional view showing after the trimming process.
Figure 13B:
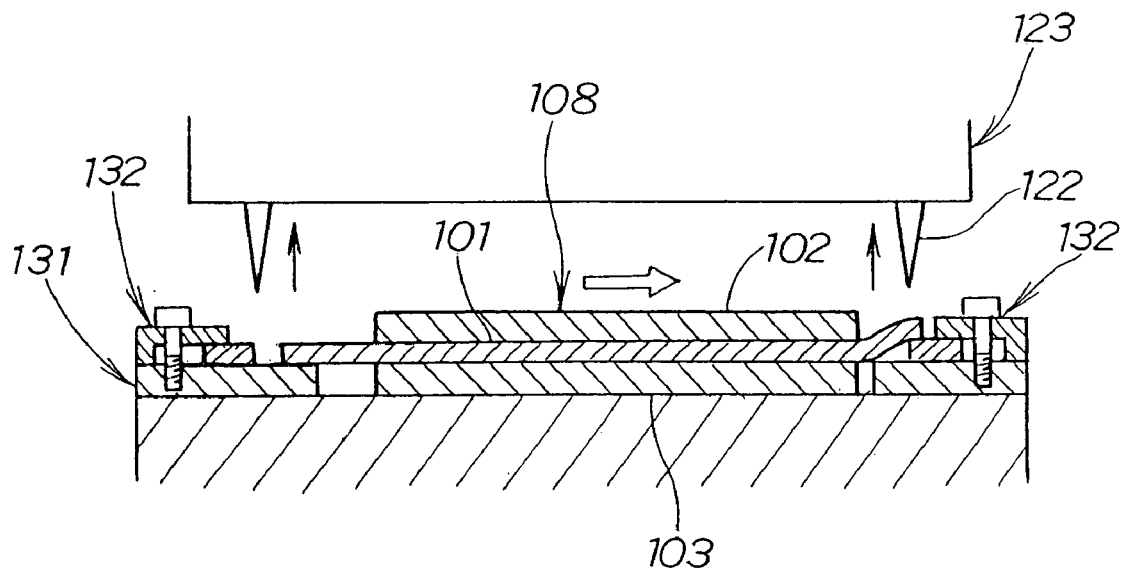
Figure 14A:
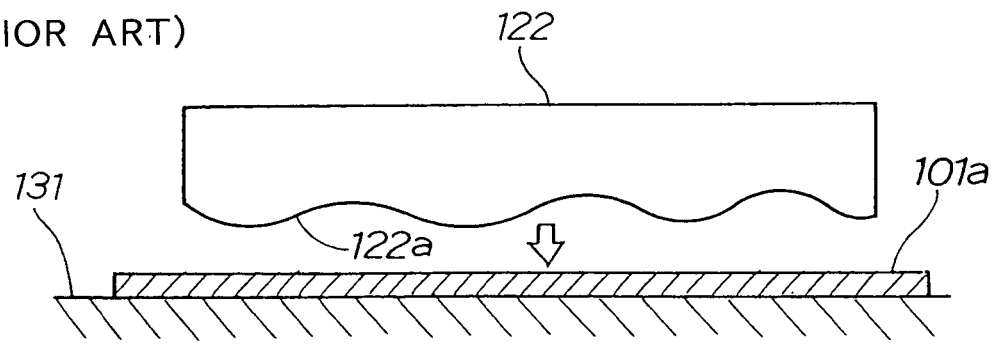
FIG. 14A and FIG. 14B are views illustrating an MEA trimming apparatus and a trimming blade shape, which influences the trimming process carried out by this trimming apparatus, FIG. 14A being a sectional view showing before the trimming process and FIG. 14B a sectional view showing after the trimming process.
Figure 14B:
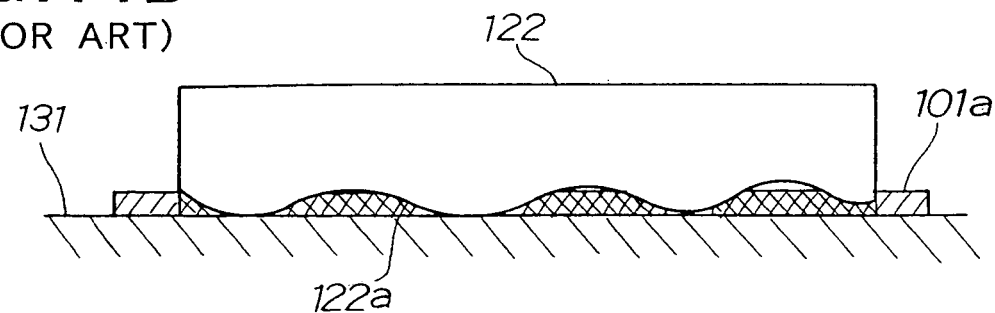
Figure 15A:
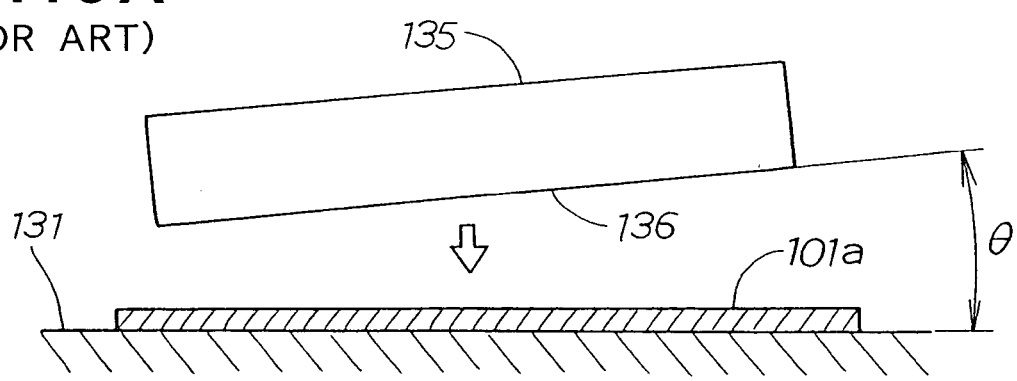
FIG. 15A and FIG. 15B are explanatory views illustrating an MEA trimming apparatus and a trimming blade inclination, which influences the trimming process carried out by this trimming apparatus, FIG. 15A being a sectional view showing before the trimming process and FIG. 15B a sectional view showing after the trimming process.
Figure 15B:
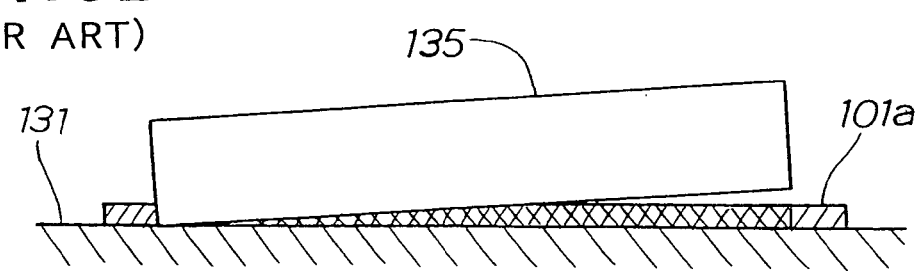

Next, the operation of the MEA carrying apparatus 72 described above will be explained, with reference to FIG. 10.

After trimming of an MEA 65a (see FIG. 8) with the MEA trimming apparatus 71 is finished, the carbon electrode 12 of the MEA 65 is suction-gripped by the first upper die suction-gripping part 44 and the PEM 13 is suction-gripped by the second upper die suction-gripping parts 45. That is, with the MEA 65 suction-gripped, the arm raising/lowering motor 82 is operated and along with the arms 81, 81 the suction-gripping/holding device 17 and the upper trimming die 16 are raised as shown by the white arrow h.

Next, the horizontal drive motor 86 is operated, and by means of the slider 78 the post 79, the arms 81, 81, the suction-gripping/holding device 17 and the upper trimming die 16 are moved horizontally as shown by the white arrows j and k.

After that, when the suction-gripping/holding device 17 and the upper trimming die 16 have been moved to above the stacking part 73, the arm raising/lowering motor 82 is operated, and along with the arms 81, 81 the suction-gripping/holding device 17 and the upper trimming die 16 are lowered as shown by the white arrow m; the MEA 65 is set on a separator 91 having been set on the stacking table 93; the suction-gripping of the MEA 65 by the first upper die suction-gripping part 44 and the second upper die suction-gripping parts 45 is ceased; and the MEA 65 is thereby stacked on the separator 91.

In this way, a cell is made from two separators 91 (one separator 91 is not shown in the figure), and multiple cells are stacked to make a fuel cell battery.

As shown in FIG. 8, because the MEA carrying apparatus 72 has the suction-gripping/holding device 17, if the MEA 65 (or the MEA 65a) is suction-gripped by the suction-gripping/holding device 17 from the time of trimming to the time of carrying, the MEA 65 can be carried from the MEA trimming apparatus 71, which is a trimming station, to the stacking part 73, which is a stacking station, still in the state of the time of trimming, without slipping sideways, and deviation of the stacking position of the MEA 65 on stacking of the MEA 65 with the separator 91 by the stacking part 73 can be prevented.

Consequently, when the MEA 65 is stacked, there is no need for the position of the MEA 65 to be corrected, and a smooth transition can be made from the carrying step to the stacking step. As a result, the manufacturability of the fuel cell can be improved.

As shown in FIG. 8, as a result of the MEA carrying apparatus 72 having the vertical movement mechanism 87 and the slider 78 serving as a horizontal moving mechanism, there are two movement directions, and consequently the direction of the force acting on the MEA 65 can be made a fixed direction at all times; it can be made difficult for shocks to act on the MEA 65 being carried; and sideways slipping of the MEA in carriage can be prevented. Therefore, when the MEA 65 is stacked, it is not necessary for the position of the MEA 65 to be corrected, and a smooth transition can be made from the carrying step to the stacking step.

Because, as described above, the fuel cell manufacturing apparatus 70 has integrally the MEA trimming apparatus 71 constituting a trimming station, the MEA carrying apparatus 72 and the stacking part 73 constituting a stacking station, a trimming step, a carrying step and a stacking step can be carried out smoothly in a single series of operations, and the manufacture of a fuel cell can be carried out efficiently. Therefore, the productivity of the fuel cell can be raised, the manufacturing cost of the fuel cell can be reduced, and a contribution can be made to the spread for example of vehicles powered by electric motors driven by fuel cells and of home generator systems.

The mechanism for suspending the pressing member on the upper trimming die may alternatively be constructed with a link mechanism provided between the two members and an elastic member for urging the pressing member toward the lower trimming die.

Besides resin, the material of the nonmetallic plate in this embodiment may alternatively be rubber, glass, ceramic or stone.

Although in this embodiment a porous plate was fitted on the bottom face of the recess, the invention is not limited to this, and instead of a porous plate a recess-shaped air reservoir may be provided on the suction-gripping means side face of a resin plate member, multiple small holes provided passing through from this air reservoir to the electrode side face, and this resin plate member attached to the bottom face of the recess in the upper trimming die.

And although in this embodiment dimensional error and assembly error of the various parts of the MEA trimming apparatus at the time of PEM trimming were absorbed using a first bearing member and a second bearing member, the invention is not limited to this, and alternatively the trimming blade 15 may be attached to the upper trimming die 16 by way of a free joint such as a ball joint, or the trimming blade 15 may be attached to the upper trimming die 16 by way of an elastic member or a soft member, to absorb these errors.

Also, although in this embodiment the MEA was moved from the trimming station to the stacking station by an MEA carrying apparatus, the invention is not limited to this, and alternatively it may be made a structure wherein the lower trimming die of the MEA trimming apparatus and the stacking part are constructed so that they can move in a straight line on a horizontal movement mechanism and after trimming of the MEA the MEA is suction-gripped by suction-gripping/holding means and lifted with a vertical movement mechanism and the lower trimming die is moved from under the MEA to elsewhere and the stacking part is moved to directly under the MEA and the MEA which was being suction-gripped by the suction-gripping/holding means is lowered with the vertical movement mechanism to stack a separator and the MEA.

When this construction is adopted, because the suction-gripping/holding means suction-gripping the MEA is only moved in the vertical direction, the movement direction can be made a single direction and positional deviation of the MEA can be still better prevented.

INDUSTRIAL APPLICABILITY

In this invention, a membrane/electrode assembly trimming apparatus is made up of a lower trimming die on which a membrane/electrode assembly is placed, an upper trimming die having a trimming blade, and a pressing member which is ascend/descendably suspended from this upper trimming die and suction-holds a carbon electrode, and a carrying apparatus is provided with suction-gripping/holding means for suction-gripping the carbon electrode and holding it so that it does not slip sideways. With this construction, because the certainty of positioning, fixing and trimming at the time of trimming of the fuel cell membrane/electrode assembly increases and positional slipping during carrying of the trimmed membrane/electrode assembly can be prevented, the performance of the fuel cell improves. With this construction, a trimming step and a carrying step can be made to connect smoothly and the transition from the carrying step to a stacking step can be made smooth, and consequently the productivity of the fuel cell increases.

Accordingly, this invention is useful in the production of fuel cells used for electric motors in vehicles and home generator systems.

The invention claimed is:

1. A fuel cell membrane/electrode assembly trimming method for, with a membrane/electrode assembly made by affixing to both sides of a polymer electrolyte membrane carbon electrodes of smaller area than this as the object of trimming, trimming with a trimming blade the edge of the polymer electrolyte membrane, characterized in that a recess with its bottom face made of a nonmetallic plate is provided in the lower trimming die, and after a carbon electrode is received in this recess and positioning of this carbon electrode is effected with two adjacent side walls of the recess the edge of the polymer electrolyte membrane is suction-gripped to the lower trimming die and the polymer electrolyte membrane is trimmed with the trimming blade.

2. A fuel cell membrane/electrode assembly trimming method according to claim 1, characterized in that the suction-gripping of the polymer electrolyte membrane is carried out on a part which becomes unneeded after trimming of the polymer electrolyte membrane.

3. A fuel cell membrane/electrode assembly trimming apparatus for, with a membrane/electrode assembly made by affixing to both sides of a polymer electrolyte membrane carbon electrodes of smaller area than this as the object of trimming, trimming with a trimming blade the edge of the polymer electrolyte membrane, characterized in that it comprises a lower trimming die on which a membrane/electrode assembly is set and an upper trimming die having a trimming blade and a pressing member ascend/descendably suspended from this upper trimming die, and the pressing member is provided with suction-gripping means for suction-gripping and holding one of the carbon electrodes.

4. A fuel cell membrane/electrode assembly trimming apparatus according to claim 3, characterized in that a pressing part for pressing down the edge of the polymer electrolyte membrane and a recess for receiving one of the carbon electrodes are provided in the pressing member, and an electrode suction hole for suctioning the carbon electrode is provided in the bottom face of this recess, and a membrane suction hole for suctioning the polymer electrolyte membrane is provided in the pressing part.

5. A fuel cell membrane/electrode assembly trimming apparatus according to claim 4, characterized in that a porous plate is fitted to the bottom face of the recess and the carbon electrode is suction-gripped using this porous plate.

6. A fuel cell membrane/electrode assembly trimming apparatus according to claim 3, characterized in that the mechanism suspending the pressing member from the upper trimming die is made up of a guide rod running between the two members and an elastic member urging the pressing member toward the lower trimming die.

7. A fuel cell membrane/electrode assembly trimming apparatus according to claim 3, characterized in that by providing the lower trimming die with a first bearing member with a larger area than the membrane/electrode assembly and fitting a second bearing member for bearing the edge of the polymer electrolyte membrane to this first bearing member, it is made a structure which transmits the trimming force of the trimming blade in the order of the edge of the polymer electrolyte membrane, the second bearing member, the first bearing member.

8. A fuel cell membrane/electrode assembly trimming apparatus according to claim 7, characterized in that the first bearing member is an elastic body.

9. A fuel cell membrane/electrode assembly trimming apparatus according to claim 8, characterized in that the second bearing member is a soft material harder than the first bearing member.

10. A fuel cell membrane/electrode assembly trimming apparatus wherein edge-trimming of a membrane/electrode assembly made by affixing to both sides of a polymer electrolyte membrane carbon electrodes of smaller area than this is carried out at a trimming station and for stacking of this edge-trimmed membrane/electrode assembly the membrane/electrode assembly is carried from the trimming station to a stacking station, characterized in that it comprises a slider which moves from the trimming station to the stacking station, an arm extending from this slider, an upper trimming die which is suspended from this arm and has a trimming blade for the trimming, arm moving means for moving the arm, and a pressing member attached to the upper trimming die for suction-gripping one of the carbon electrodes and holding it so that it does not slip sideways.

11. A membrane/electrode assembly according to claim 10, characterized in that the arm moving means comprises a vertical movement mechanism for moving the arm in the vertical direction and a horizontal movement mechanism for moving the arm horizontally and in a straight line.

* * * * *